United States Patent Office 3,348,707
Patented Oct. 24, 1967

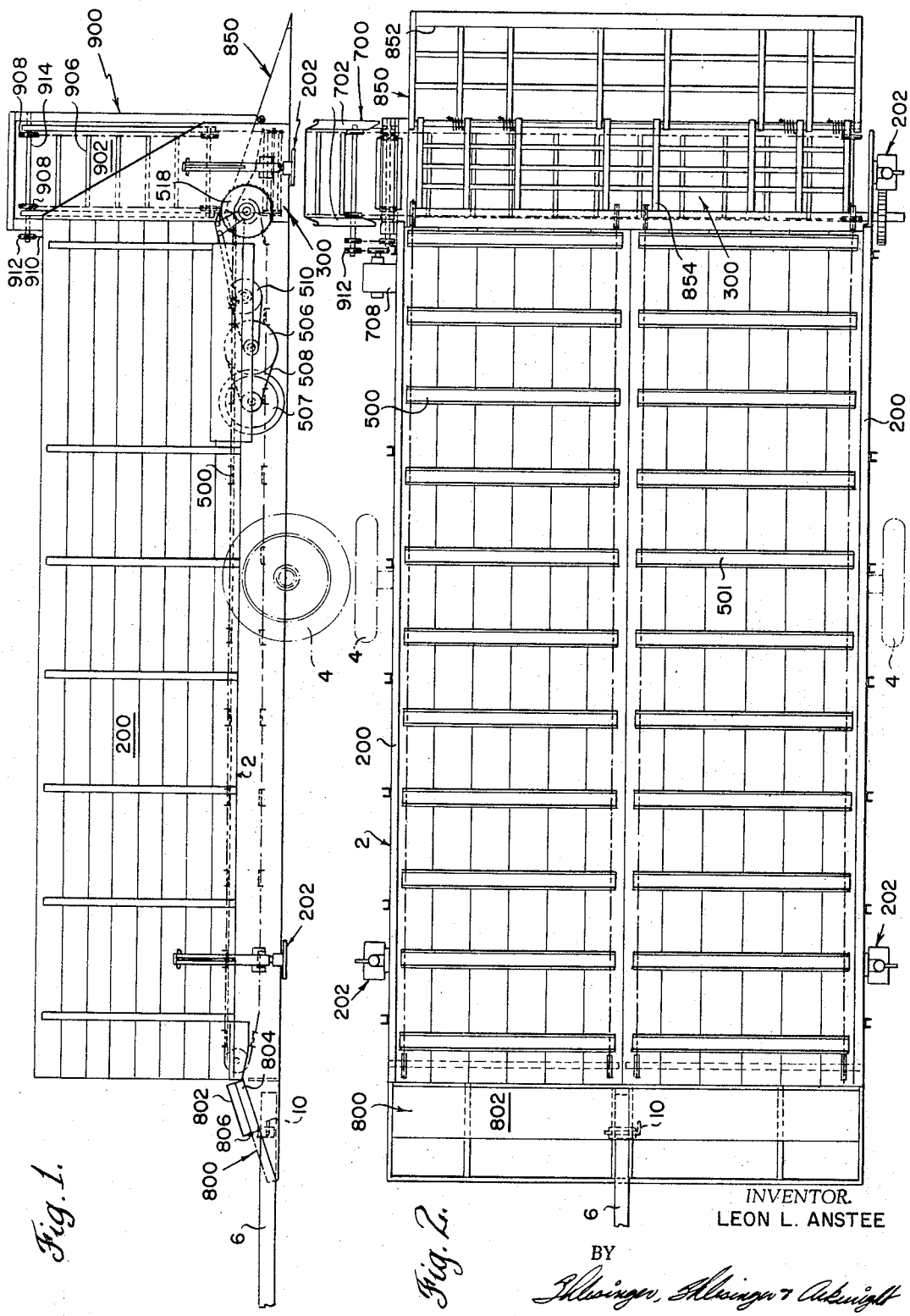

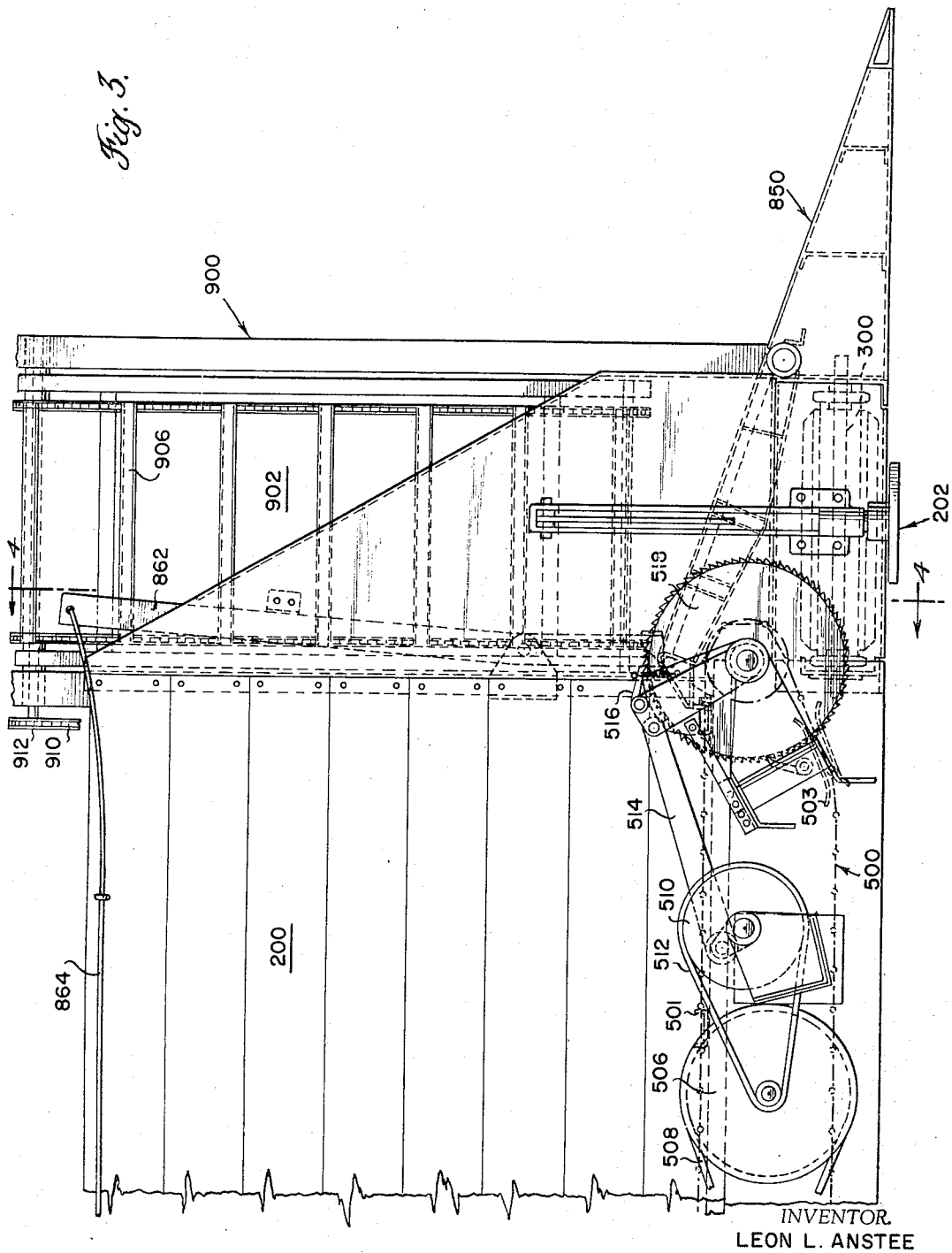

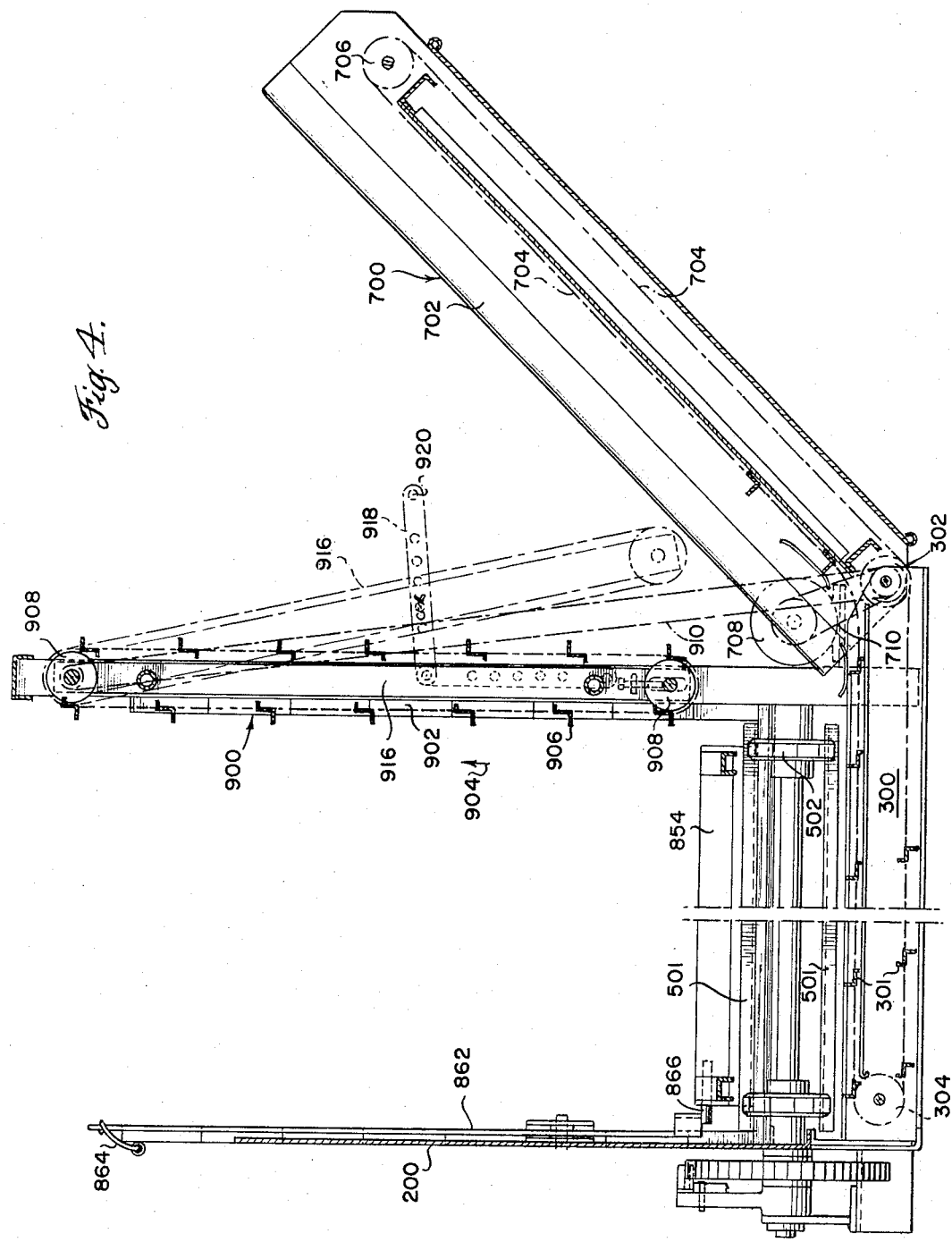

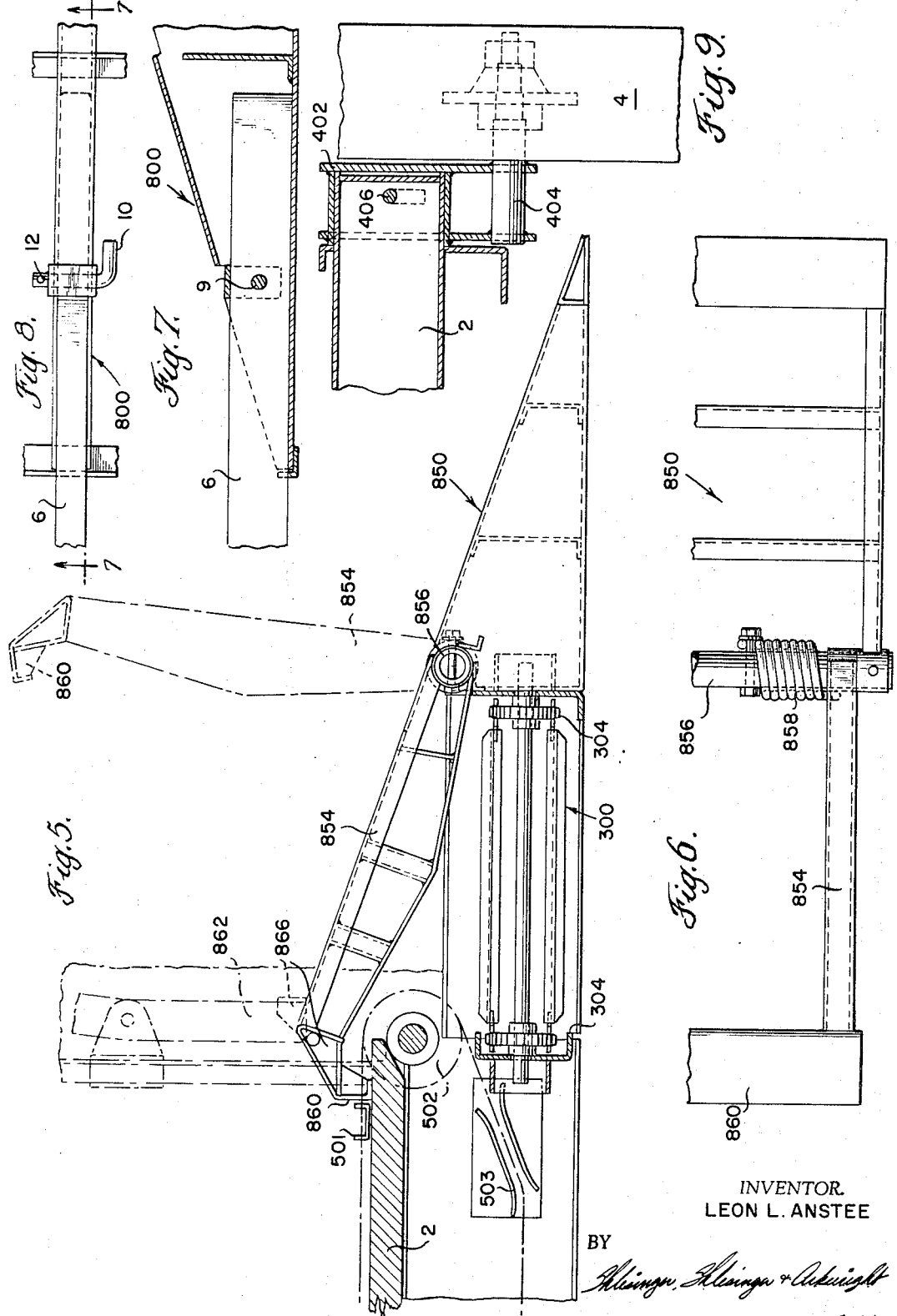

3,348,707
FORAGE RECEIVING AND SELF-
UNLOADING UNIT
Leon L. Anstee, Leola, Pa., assignor to Sperry Rand Corporation, New Holland, Pa., a corporation of Delaware
Filed Oct. 22, 1965, Ser. No. 500,979
6 Claims. (Cl. 214—44)

ABSTRACT OF THE DISCLOSURE

This invention relates to a self-unloading device for receiving and unloading forage and the like comprising, in combination, an elongated frame capable of receiving a dump vehicle for dumping thereon and including a feed conveyor operable to move forage longitudinally from one end of said frame to the other end of said frame; and said feed conveyor having input and output ends; and an output conveyor on the other end of said frame and adjacent the feed conveyor output end and extending transversely with respect thereto and lying in a plane spaced from and below the plane of said feed conveyor output end and having an output end, a metering device adjacent to and mounted above the output conveyor output end and adjustable with respect thereto and extending substantially across the width of the output conveyor, and said frame being opened at both ends and having front and rear ramp means, and said rear end means including means for covering said output conveyor when a dump vehicle is driven therethrough, and said rear end means including movable barrier means having operating and nonoperating positions for directing forage from the end of said feed conveyor into said output conveyor when said barrier means is in operating position.

---

This invention relates generally to a self-unloading device and more particularly to a forage receiving and self-unloading unit.

The unloading of forage and other farm commodities from self-unloading wagons requires considerable time due to the capacity limitations imposed by the conveying means being used. For example, forage blowers, elevators, transfer augers, and the like require a considerable amount of time wasted in waiting for the unloading wagon to slowly unload into the blower or elevator. This reduces the overall efficiency of the entire harvesting operation.

An object of the instant invention is to provide a device which will receive the entire contents of a farm wagon and subsequently meter out the contents while the device is unattended. The metering out of the contents is at a rate proportional to the capacity of the elevator or blower.

Another object of the invention is to provide a forage receiving unit which is designed so that a truck or farm wagon may drive completely through the unit, thus eliminating the necessity of backing into the forage receiving unit.

Another object is to provide a metering device which includes an angularly movable, adjustably mounted metering device for regulating the amount of material discharged by a conveyor.

Another object of the invention is to provide a metering device which includes a rotating element positioned adjacent the end of an output conveyor for regulating the amount of material delivered by the conveyor.

Still another object includes the provision of a forage receiving unit having a ramp which also may be converted into an end gate to prevent material from falling off the conveyor.

Another object is to provide quickly attachable wheel and hitch assemblies which will enable the unit to be readily transportable.

A further object of the invention is to provide a forage receiving unit including hand operable jacks to level the unit for operation at various locations on a farm, as well as providing means to raise the unit for attaching transport wheels.

A further object of the invention is to provide a unit which can handle a variety of farm products, including corn silage, grass silage, random bales, ear corn, shelled corn, and grains.

According to the present invention, the foregoing and other objects are attained by providing a self-unloading device having a frame, a feeding conveyor located on the frame feeding material onto an output conveyor. The output conveyor then carries the material under an angularly movable, adjustably mounted metering device for regulating the amount of material discharged by the output conveyor.

Other objects and advantages will become apparent upon reference to the following description of one embodiment of the invention as illustrated in the accompanying drawings, wherein:

FIGURE 1 is a side elevation view of a forage receiving and self unloading unit constructed in accordance with the invention;

FIGURE 2 is a plan view of FIGURE 1;

FIGURE 3 is an enlarged side view of the forage unloading end of the unit;

FIGURE 4 is a cross-sectional view taken along 4—4 of FIGURE 3;

FIGURE 5 is a fragmentary detailed view showing the end gate in its lowered or ramp position and in its raised position (in dot-dash lines);

FIGURE 6 is a fragmentary plan view of FIGURE 5 illustrating one of the torsion springs of the end gate;

FIGURE 7 is a fragmentary section view of the readily attachable hitch means;

FIGURE 8 is a plan view of FIGURE 7; and

FIGURE 9 is a fragmentary sectional view of the readily attachable wheel arrangement.

Referring now to the drawings wherein like reference numerals designate identical or corresponding parts throughout the several views, and more particularly to FIGURE 1 wherein 1 denotes the forage receiving and self-unloading unit having a frame 2 which is mounted on wheels 4. A tractor hitch 6 is pivotally connected to a front ramp frame 800 through a pin 10, including a cotter key hole 12 (best seen in FIGURES 7 and 8).

Ramps

The front ramp 800 includes a pair of substantially solid plates or boards 802 and 804. Plate 802 is shown pivoted on plate 804 at point 806. Therefore when the unit is in a ground engaging position (as discussed further below), plate 802 may be pivoted to an end-to-end position with plate 804 to provide a smooth ramp.

A second or rear ramp 850 is also mounted on frame 2. Ramp 850 includes a first portion 852 and a second or gate portion 854. Gate portion 854 (as best seen in FIGURES 5 and 6) is pivotally mounted on the first portion at 856. Portion 854 includes a biasing means in the form of spring 858 to force the frame into an upright gate position as seen in FIGURE 5.

The gate has an abutment plate 860 for resting on frame 2 when in its lowered position.

Plate 860 and gate 854 may be released from their ramp position by means of lever 862 connected to operating line 864. When lever 862 is actuated, pin 866 moves to allow the ramp to move to its gate position (dotted lines in FIGURE 5).

Jacks

Mounted on frame 2 are a pair of side members or walls 200. Two pair of jacks 202 are also mounted on frame 2.

These jacks provide means to adjustably locate the unit on uneven ground, to stabilize the unit and to raise and lower it. It is apparent that the jacks are used to raise the unit when the wheels are to be removed. The jacks 202 then are lowered so that the unit will rest on the ground.

Conveyors

An output conveyor 300 moves under the second or gate portion 854 as seen in FIGURE 5. However, referring now to FIGURE 4 it can be seen that the output conveyor includes a plurality of slats 301 connected together by conventional means in an endless chain fashion around sprockets 302 and 304.

Carrying material to the output conveyor 300 is a feeding conveyor 500 moving over the length of frame 2. The conveyor 500 is mounted only slightly above the output conveyor 300 so that material will fall onto the output conveyor and be carried out of the unit. As seen in some detail in FIGURE 5 the feeding conveyor includes a plurality of moving slats 501 carried over sprockets such as 502 and through guides 503 in an endless chain manner.

Referring particularly to FIGURE 3, the drive means for conveyor 500 is best illustrated. This includes a pulley 506 connected to a motor 507 (see FIGURE 1) by a belt 508. Pulley 506 is connected to a second pulley 510 by means of a chain or belt 512. Eccentrically mounted on pulley 510 is a lever 514 operating a pawl 516, which in turn rotates ratchet 518, thus moving the feeding conveyor in a known manner by rotating sprocket 502.

Connected to the output conveyor 300 is a discharge conveyor 700 best seen in FIGURE 4. This conveyor includes sidewalls 702 to contain material moving over endless conveyor 704. The conveyor 704 rotates over sprockets 706 at its discharge end and 302 of the output conveyor.

The conveyor is operated by means of motor 708 through belt 710. It will be noted that motor 708 operates both conveyors 300 and 700.

Metering device

A metering device 900 is mounted between output conveyor 300 and discharge conveyor 700. The metering device includes an angularly or rotating means 902 moving in the direction of arrow 904. Element 902 is also an endless chain including slats or the like 906 rotating on a plurality of sprockets 908. The metering device is driven off motor 708 by means of a chain or belt 910 connected to sprocket 912. As seen in FIGURE 1 sprockets 908 and 912 are connected in driving engagement through shaft 914.

The metering device is mounted on a support 916 so that it is angularly or pivotally movable (see FIGURE 4). By pivoting the metering device outwardly and utilizing an arm 918 having a plurality of holes 920, the device may be adjusted to a number of angular positions through the use of a fastening means at 922.

It is apparent that the metering device will regulate the amount of material moving off output conveyor 300 to discharge conveyor 700 depending upon the angular position relative to bar 918 and/or depending on the angular or rotational speed of the endless chain member 902.

Wheels

As seen in FIGURE 9 the wheels 4 may be taken off by either removing an axle holder 402 from frame 2, or by merely removing the wheel 4 from axle 404. A pin 406 is utilized to detachably retain axle holder 402 on the frame 2.

Operation

When it is desired to load the unit, jacks 202 are extended and wheels 4 are removed. The jacks then lower the unit to the ground. Ramp section 802 is pivoted on point 806 and is placed in end-to-end engagement with section 804. End gate 854 is moved against bias spring 858 to engage pin 866, thus covering output conveyor 300. A truck or wagon may now move up over one ramp, discharge the forage onto the feeding conveyor 500 and drive off the other ramp. Lever 862 then is operated, disengaging pin 866 from plate 860, allowing the gate 854 to assume the dotted line position in FIGURE 5.

Motors 507 and 708 are then activated so that material moves over conveyor 500 onto output conveyor 300. As the forage moves transverse to the frame it encounters metering device 900. The metering device is rotating in a tangential direction opopsite to the movement of forage from unit 300 on discharge conveyor 700. As indicated above the rate that the material is discharged is determined by the angle at which the metering device is placed. This angle is fixed by adjusting the device in holes 920 on arm 918. By moving the lower portion of the device farther away from the juncture of conveyors 300 and 700, more material is allowed to move off of the unit. The amount of forage leaving the unit is determined in accordance with the speed of operation of the receiving blower or elevator.

Motor 708 operates conveyors 300 and 700 through sprocket 302 which is common to chains 301 and 704. Chain or belt 910 is also connected to 302 and provides the rotational movement for metering device 900 as it is attached to drive sprocket 912.

In a similar manner, conveyor 500 is operated by motor 507 connected by belt 508 to pulley 506, which in turn drives pulley 510. Lever 514 operates ratchet 516, thus rotating ratchet wheel 518 connected to the feeding conveyor 500.

While the invention has been described in connection with one embodiment thereof, it will be understood that it is capable of modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. A self-unloading device for receiving and unloading forage and the like comprising, in combination:
    (a) an elongated frame capable of receiving a dump vehicle for dumping thereon,
    (b) a feed conveyor on said frame operable to move forage longitudinally from one end of said frame to the other end of said frame,
    (c) said feed conveyor having input and output ends,
    (d) an output conveyor on said other end of said frame and adjacent said feeder conveyor output end and extending transversely with respect thereto and lying in a plane spaced from and below the plane of said feed conveyor output end and having an output end,
    (e) a metering device adjacent to and mounted above said output conveyor output end and adjustable with respect thereto and extending substantially across the width of said output conveyor,
    (f) said frame being opened at both ends and having front and rear ramp means,
    (g) said rear ramp means including means for covering said output conveyor when a dump vehicle is driven therethrough, and
    (h) said rear ramp means including movable barrier means having operating and non-operating positions for directing forage from the end of said feed conveyor into said output conveyor when said barrier means is in the operating position.

2. A self-unloading device as defined in claim 1, and wherein, (a) said metering device includes a rotating element having a portion thereof located adjacent the output end of said output conveyor, the direction of rotation being opposite the direction of rotation of said output conveyor.

3. A self-unloading device as defined in claim 1 and including:

(a) a discharge conveyor having an input end mounted adjacent said output end of said output conveyor and below said metering device.

4. A self-unloading device as defined in claim 1 and wherein:

(a) said barrier means is movable from an inclined position to a vertical position, and
(b) spring biasing means for biasing said barrier means to the upright position.

5. A self-unloading device as defined in claim 1 and including:

(a) removable side walls on said frame.

6. A self-unloading device as defined in claim 1 and including:

(a) means for elevating the output end of said discharge conveyor.

References Cited
UNITED STATES PATENTS

| | | | |
|---|---|---|---|
| 163,077 | 5/1875 | Jackson | 198—161 |
| 761,709 | 6/1904 | Pierce | 214—45 |
| 1,444,704 | 2/1923 | Petteys | 214—46 |
| 3,189,200 | 6/1965 | Arnold | 214—46 |

ROBERT G. SHERIDAN, *Primary Examiner.*